United States Patent
Liu et al.

(10) Patent No.: US 10,321,501 B2
(45) Date of Patent: Jun. 11, 2019

(54) CONTROL METHOD FOR RAPID CONNECTION AND DATA TRANSMISSION BETWEEN DEVICES

(71) Applicant: WUXI SHILING TECHNOLOGY CO., LTD., Wuxi (CN)

(72) Inventors: Jun Liu, Wuxi (CN); Jianfeng Shen, Wuxi (CN); Xiaodong Wang, Wuxi (CN); Lin Chen, Wuxi (CN); Hua Li, Wuxi (CN); Ping Sun, Wuxi (CN)

(73) Assignee: WUXI SHILING TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 15/550,465

(22) PCT Filed: Apr. 24, 2015

(86) PCT No.: PCT/CN2015/077435
§ 371 (c)(1),
(2) Date: Oct. 30, 2017

(87) PCT Pub. No.: WO2016/127494
PCT Pub. Date: Aug. 18, 2016

(65) Prior Publication Data
US 2018/0049257 A1  Feb. 15, 2018

(30) Foreign Application Priority Data
Feb. 12, 2015  (CN) .......................... 2015 1 0076403

(51) Int. Cl.
*H04W 76/14*  (2018.01)
*H04B 5/02*  (2006.01)
(Continued)

(52) U.S. Cl.
CPC ............ *H04W 76/14* (2018.02); *G06K 1/121* (2013.01); *G06K 7/10366* (2013.01); *H04B 5/02* (2013.01); *H04W 4/80* (2018.02)

(58) Field of Classification Search
CPC ....................................................... H04W 4/80
See application file for complete search history.

(56) References Cited

U.S. PATENT DOCUMENTS 7,126,481 B2  10/2006  Vesikivi
8,823,494 B1  9/2014  Kovitz
(Continued)

FOREIGN PATENT DOCUMENTS

CN   101061500 A   10/2007
CN   102595643 A   7/2012
(Continued)

OTHER PUBLICATIONS

International Search Report in international application No. PCT/CN2015/077435, dated Nov. 25, 2015.
(Continued)

*Primary Examiner* — Hsinchun Liao
(74) *Attorney, Agent, or Firm* — Syncoda LLC; Feng Ma

(57) ABSTRACT

A control method for rapid connection and data transmission between devices includes: writing relevant information about a wireless short-range communication module in a slave device into an RFID label via an RFID reader module, or printing the relevant information into a bar code label via a bar code printer and fixing the RFID label or the bar code label on the sensor device; and by using the RFID reader module or a bar code recognizer in the master device, reading information about the RFID label or the bar code label, starting the function of the wireless short-range communication module according to the acquired information, automatically matching the relevant information, and pop- (Continued)

ping up a corresponding user interface according to the obtained type information about the sensor device to display the collected data.

17 Claims, 4 Drawing Sheets

(51) Int. Cl.
    *H04W 4/80*     (2018.01)
    *G06K 1/12*     (2006.01)
    *G06K 7/10*     (2006.01)

(56) References Cited

U.S. PATENT DOCUMENTS

| | | | |
|---|---|---|---|
| 2002/0154607 A1* | 10/2002 | Forstadius | H04B 7/2606 370/311 |
| 2006/0071778 A1 | 4/2006 | Vesikivi | |
| 2007/0149862 A1* | 6/2007 | Pipke | A61B 5/0205 600/301 |
| 2009/0069000 A1* | 3/2009 | Kindberg | G06F 16/9577 455/414.3 |
| 2012/0220351 A1* | 8/2012 | Kerai | H04W 52/0229 455/574 |
| 2015/0326610 A1* | 11/2015 | Bartoszewski | H04L 41/0813 726/1 |

FOREIGN PATENT DOCUMENTS

| | | |
|---|---|---|
| CN | 103529782 A | 1/2014 |
| CN | 103824099 A | 5/2014 |
| CN | 103903029 A | 7/2014 |
| CN | 204515804 U | 7/2015 |

OTHER PUBLICATIONS

English Translation of the Written Opinion of the International Search Authority in international application No. PCT/CN2015/077435, dated Nov. 25, 2015.

\* cited by examiner

CONTROL METHOD FOR RAPID CONNECTION AND DATA TRANSMISSION BETWEEN DEVICES

TECHNICAL FIELD

The disclosure relates to a control method for performing rapid connection and data transmission between devices.

BACKGROUND

At present, a wireless short-range communication technology may be used for data communications between devices. Application of a wireless short-range communication module (e.g., Bluetooth module, ZigBee module and WIFI module) to various devices solves the troubles of wiring to make it convenient and fast. However, as the wireless short-range communication technology is applied more and more widely, the defects of the wireless short-range communication technology in actual use is exposed. As shown in FIG. 1, a master device (terminal device) is intended to collect data from a slave device (sensor device) having a wireless short-range communication function. In such a case, functions of a wireless short-range communication module are started on a specific interface of the master device, and then relevant information (e.g., secret key) is manually input as required. After the master device is connected with the sensor device, a sensor device data type is selected via a user interface. Data can be collected and then transmitted to a data center through a wireless local-area or wide-area communication module (e.g., wireless local-area WIFI module and wireless wide-area 2G/3G/4G module). During the use, the wireless short-range communication module needs to be manually started, and the relevant information (e.g., secret key) needs to be manually input, and a sensor device type needs to be manually selected. Thus, the whole operation flow makes the wireless short-range communication technology complicated in use. Moreover, since a target to be connected varies or the target to be connected is frequently changed from one to another, the wireless short-range communication module is more complicated in actual use. It is necessary to select a sensor device data type on the user interface every time when data is collected, so it is inconvenient for a user to use. For example, in case of Bluetooth pairing and connection, if two Bluetooth modules need to communicate with each other, it is necessary to ensure that configuration files are matched. It is necessary to ensure that Bluetooth functions of all devices that communicate through a Bluetooth wireless technology have been already started. In consideration of safety, the two Bluetooth modules need to be paired, and then data can be exchanged. Bluetooth pairing needs to be performed on a specific interface, and pairing needs be achieved by inputting a corresponding secret key, thereby causing great inconvenience for Bluetooth use. A Service Set Identifier (SSID) and secret key of a corresponding wireless local area network are required such that the WIFI module can be connected to a corresponding network. Connection communication can be performed through corresponding software only when the connection to the network is successful. Thus, the process of connection establishment and data acquisition is relatively complicated. Particularly, a mobile terminal is used to collect sensor data such as temperature, blood pressure or blood glucose. In addition, some of many sensor devices used currently do not have a wireless short-range communication function, and thus, when the master device is used to collect sensor device data, the wireless short-range communication function cannot be used, but it is necessary to select a sensor device data type on a user interface and to manually record data. Thus, the workload on manual data recording is large, errors are easily made, and the workload of an operator is great.

Due to restriction to the abovementioned operation, the utilization rate of the wireless short-range communication function is not high. For example, for Bluetooth connection, many users merely use Bluetooth earphones and seldom use Bluetooth to transmit data.

To sum up, the wireless short-range communication function, such as a Bluetooth function, adopted on the terminal device in the conventional art is relatively complicated in terms of starting, closing and pairing operations. As a result, many users are not willing to use wireless short-range communication modules for communications between devices. Moreover, it is necessary to manually select a sensor device data type on the user interface of the master device, so the operation process is complicated. Thus, there is a demand for a safe and easy-to-use control method for performing rapid connection and data transmission between devices without manually starting a wireless short-range communication function (e.g., Bluetooth and WIFI functions), manually inputting verification information (e.g., Bluetooth and WIFI user verification codes), manually selecting a sensor device data type on a user interface of a master device, and manually matching.

SUMMARY

For one of the technical problems to be solved, the disclosure provides a safe and easy-to-use control method for performing rapid connection and data transmission between devices without manually starting a wireless short-range communication function (e.g., Bluetooth and WIFI functions), without manually inputting verification information (e.g., Bluetooth and WIFI user verification codes) and without manually inputting type information about a connected sensor device, thereby omitting the process of manual matching and manual input.

To solve the abovementioned technical problems, the disclosure provides several relevant technical solutions as follows. A control method for performing rapid connection and data transmission between devices is characterized by including: writing, by a Radio Frequency Identification (RFID) reader and writer module, relevant information, such as address information and sensor device type information, about a wireless short-range communication module in a slave device (sensor device) into an RFID label, or printing, by a bar code printer, the relevant information into a bar code label; and fixing the RFID label or the bar code label onto the sensor device; and reading, by the RFID reader and writer module or a bar code reader in the master device (terminal device), information from the RFID label or from the bar code label; starting a function of the wireless short-range communication module according to the read information; automatically matching relevant information (e.g., secret key), and popping up a corresponding user interface according to the obtained sensor device type information to display collected data.

As an improvement, the collected data is transmitted to a data center through a wireless local-area or wide-area communication module (e.g., wireless local-area WIFI module and wireless wide-area 2G/3G/4G module).

As an improvement, when the sensor device has a wireless short-range communication function (e.g., Bluetooth, ZigBee and WIFI), for performing rapid connection and then rapid data transmission by using the RFID label, to the method includes the following steps.

Step 1: writing, by a Radio Frequency Identification (RFID) reader and writer module, information about a wireless short-range communication module, such as a Media Access Control (MAC) address of a Bluetooth or a WIFI wireless network Service Set Identifier (SSID) and a secret key, into an RFID label, writing a serial number and type information of a sensor device into the RFID label, and fixing the RFID label onto the sensor device;

Step 2: when it is necessary to acquire data information about the sensor device, reading information from the RFID label by using an RFID function of a terminal device, to acquire information about the wireless short-range communication module such as the MAC address of Bluetooth or WIFI SSID and secret key information and sensor device type information; judging a used communication mode from the read information; when a Bluetooth function is used, automatically starting, by the terminal device, a Bluetooth module, searching for a Bluetooth module with the corresponding name; after the Bluetooth module is found, performing Bluetooth pairing by automatically inputting the read secret key information; and after pairing is successful, sending a command to establish a connection; and when the read information indicates that the sensor device is connected through WIFI, automatically connecting the terminal device to an SSID of the corresponding wireless local area network and inputting the read secret key information; and after the connection to the SSID of the wireless local area network is successful, automatically connecting client software on the terminal device to the sensor device to acquire data from the sensor device; and Step 3: after the connection is established, automatically selecting and entering, by the terminal device, an application interface (e.g., temperature collection interface) for the sensor device according to the sensor device type information (e.g., thermometer) acquired from the RFID label; when the sensor device acquires sensing data (e.g., body temperature of a patient), automatically uploading the sensing data to the application interface (e.g., temperature collection interface) for the sensor device of the terminal device through the wireless short-range communication connection that is already established; and if necessary, uploading the sensing data to a remote background server (e.g., data center) through a wireless local-area or wide-area module of the terminal device.

As an improvement, after the Step 3, the method further comprises: Step X, maintaining the established data link, until the terminal device starts to read the RFID label for next time (that is, before establishing a new wireless short-range communication connection); and when the link is broken, automatically re-establishing the connection according to the Bluetooth MAC address or the SSID and the secret key of the wireless local area network; or Step Y, when data transmission is completed and the connection needs to be disconnected, clicking, by a user, an off key on a user operation interface to switch off a Bluetooth or WIFI device; or, after the terminal device is screen-off, entering a power-saving mode or automatically disconnecting the connection of the wireless short-range communication module, and after the terminal device is screen-on, re-establishing the connection.

As an improvement, when the sensor device has the wireless short-range communication function (e.g., Bluetooth, ZigBee, WIFI or the like), rapid connection and then rapid data transmission are implemented by using the RFID label or a bar code label by performing the Steps 1 to 3 and the Steps X and Y.

As an improvement, when a used device does not have a wireless short-range communication function, a Radio Frequency Identification (RFID) label and a bar code label only contain device information; and wherein after RFID label data or bar code label data is read, a system automatically judges what the device is, and then entering a corresponding interface for convenience of user operations; and for example, when blood pressure information is to be presented, a blood pressure information input interface is entered, and when blood glucose information is to be presented, a blood glucose information input interface is entered, such that the user has a convenient and fast use experience.

A control method for performing rapid connection and data transmission between devices, the method applied to a data transmission system, the data transmission system comprising at least one master device (terminal device) and a slave device (sensor device), wherein both the master device and the slave device comprise a wireless short-range communication module such as a Bluetooth module; the terminal device comprises a master control unit, a power management unit, a wireless short-range communication module, a wireless local-area or wide-area communication module, a Radio Frequency Identification (RFID) reader and writer module, an antenna, and a bar code reader; the power management unit, the wireless short-range communication module, the wireless local-area or wide-area communication module, the bar code reader and the RFID reader and writer module are electrically connected to the master control unit, respectively; the antenna is connected to the RFID reader and writer module; the power management unit is configured to supply power to the whole system; the wireless short-range communication module is configured to transmit data, comprising electronic documents, recordings and pictures, between the master device and the slave device; the RFID reader and writer module is configured to perform data collection of an RFID electronic label; and the bar code reader is configured to identify a bar code label.

As an improvement, the RFID reader and writer module supports a plurality of bands, and the master control unit consists of a mobile phone platform and an operating system, and is configured to perform RFID data processing.

As an improvement, the RFID reader and writer module performs transmission and receiving by adopting an omni-directional antenna.

As an improvement, a wireless local area network WIFI module or a wireless wide area network 2G/3G/4G module is integrated in the master control unit, and is configured to complete connection and data exchange with an external server (e.g., data center) through WIFI or 2G/3G/4G wireless communications, and the master control unit is also provided with a Liquid Crystal Display (LCD) screen for human-computer interaction.

As an improvement, the bar code reader may read bar code information, a bar code containing device and secret key information; and light emitted by the bar code reader contains location light, capable of rapidly and accurately reading the bar code.

After adopting the abovementioned system and control method, the disclosure has the following advantages. During use of many terminal devices having a wireless short-range communication function, a wireless short-range communication module such as a Bluetooth module will be set via a specific interface. The Bluetooth module is started, and then Bluetooth sweeping is started. When some other Bluetooth modules are found, Bluetooth pairing is prompted. After pairing is successful, a connection will be established. During this process, the connection can be established by knowing a password in advance, data transmission may be started after the connection is established. After the data transmission is completed, the Bluetooth module should be manually switched off. Device connection and data transmission can be implemented only when a WIFI module manually selects a WIFI SSID and then inputs the password. The present solution solves the problems of complicated and unsafe wireless device connection, a Bluetooth MAC address, the WIFI SSID and a secret key are acquired through the RFID or an implementation mode of reading a bar code, application software in a device terminal automatically and rapidly establishes a Bluetooth or WIFI connection according to the acquired information to transmit data, and the acquired information contains device information, so information about the collected data may be known, such that a corresponding interface can be popped up for a user to operate. The convenient and fast effects are achieved, and the problem of complicated input of data into a device without a wireless communication function is also solved. All data transmissions are performed according to a certain frame format and encrypted, so the data safety is high, use is greatly facilitated, and the efficiency of data transmission between devices is improved.

An RFID technology adopted in the present solution can implement long transmission distance, large coverage area and short response time, and can dynamically transmit data in real time to implement data exchange between two devices, an RFID supporting a plurality of bands and supporting reading of a plurality of electronic labels. A bar code reader adopted in the present solution is convenient in location, high in decoding efficiency, high in error-correcting capacity, and capable of rapidly identifying bar code information. The RFID and bar code technologies are combined with a wireless technology, so the efficiency of rapid connection between devices is effectively improved, and the rate of data collection between sensor devices is improved.

To sum up, the disclosure provides a safe and easy-to-use control method for performing rapid connection and data transmission between devices without manually starting a wireless short-range communication function (e.g., Bluetooth function) and without manually inputting verification information (e.g., Bluetooth user verification code), thereby omitting the process of manual matching.

DETAILED DESCRIPTION

The disclosure will be further illustrated in detail hereinbelow with reference to the drawings.

Figure 1:
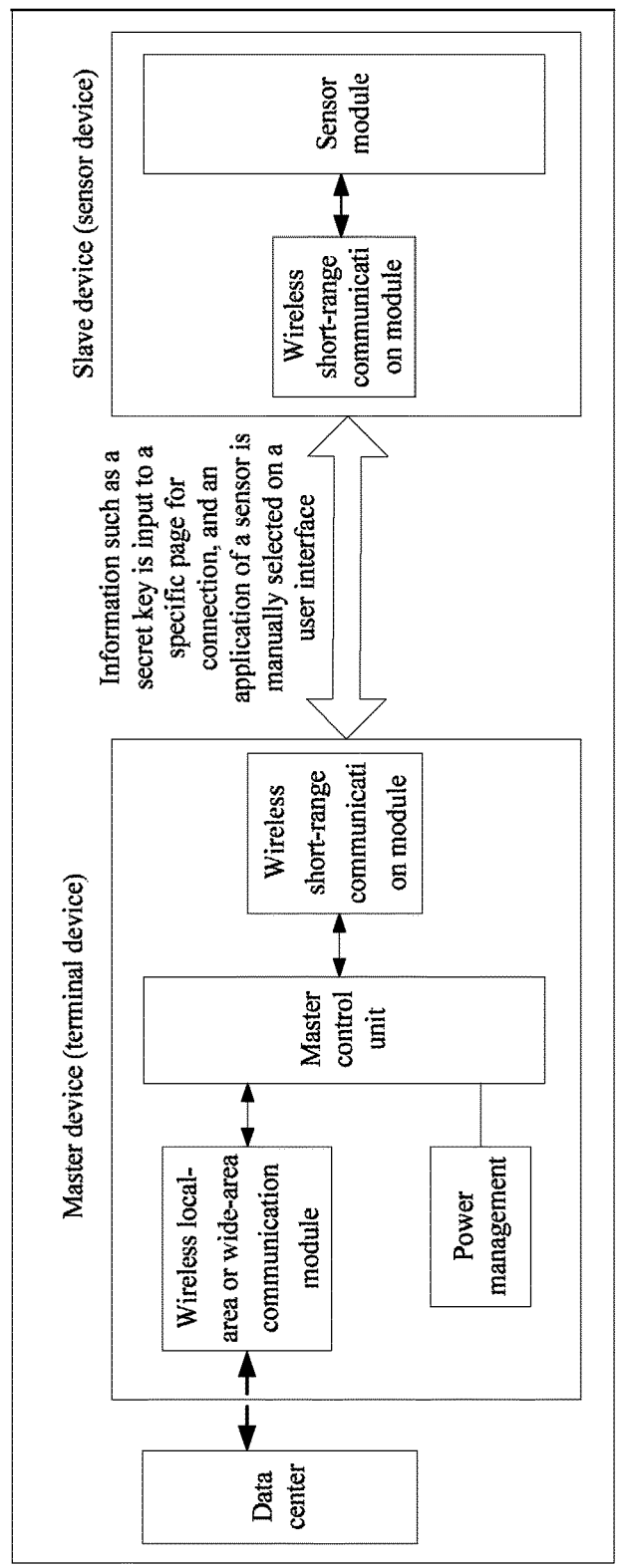
FIG. 1 is a schematic view illustrating configuration of a conventional system for collecting data from a sensor device.
Figure 2:
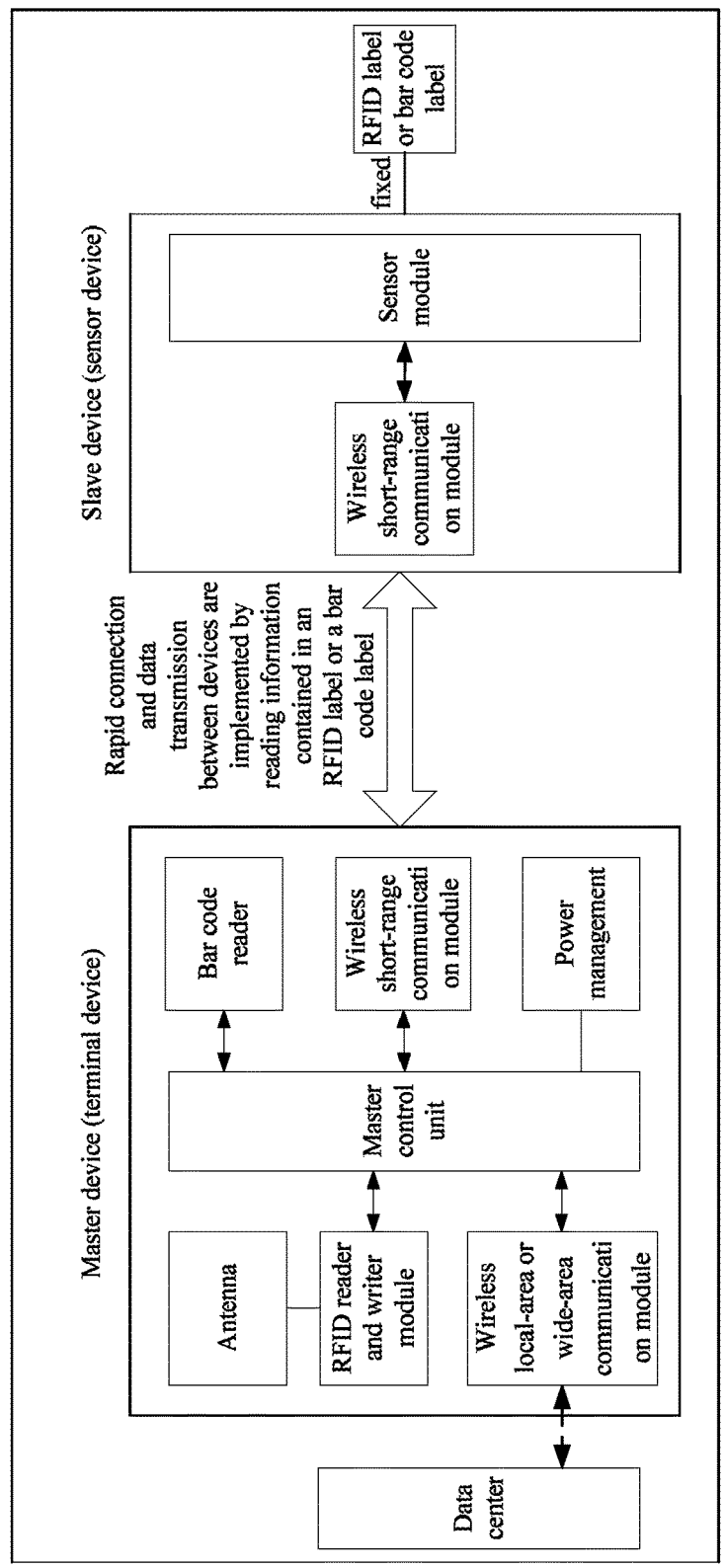
FIG. 2 is a schematic view illustrating connection and communication between a master device and a slave device of a system for performing rapid connection and data transmission between devices.
Figure 3:
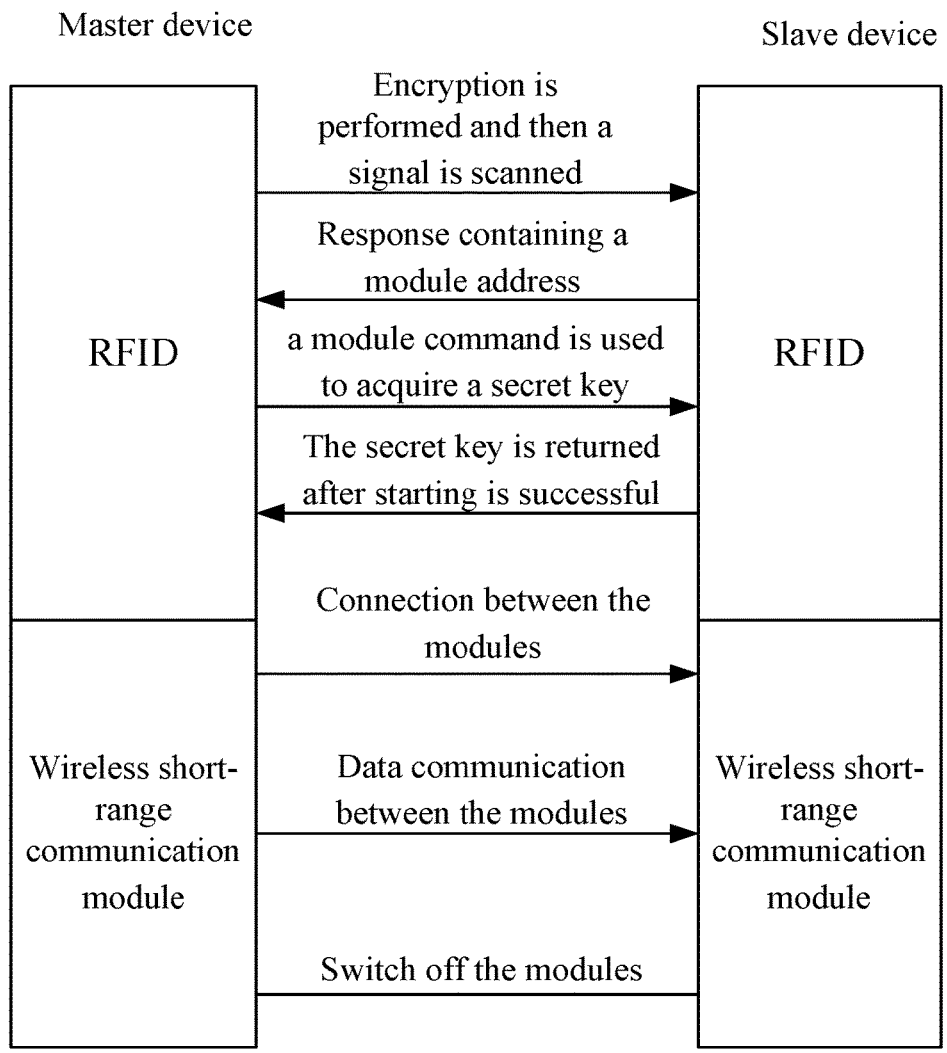
FIG. 3 is one of schematic views illustrating communication between a master device and a slave device involved in the disclosure.
Figure 4:
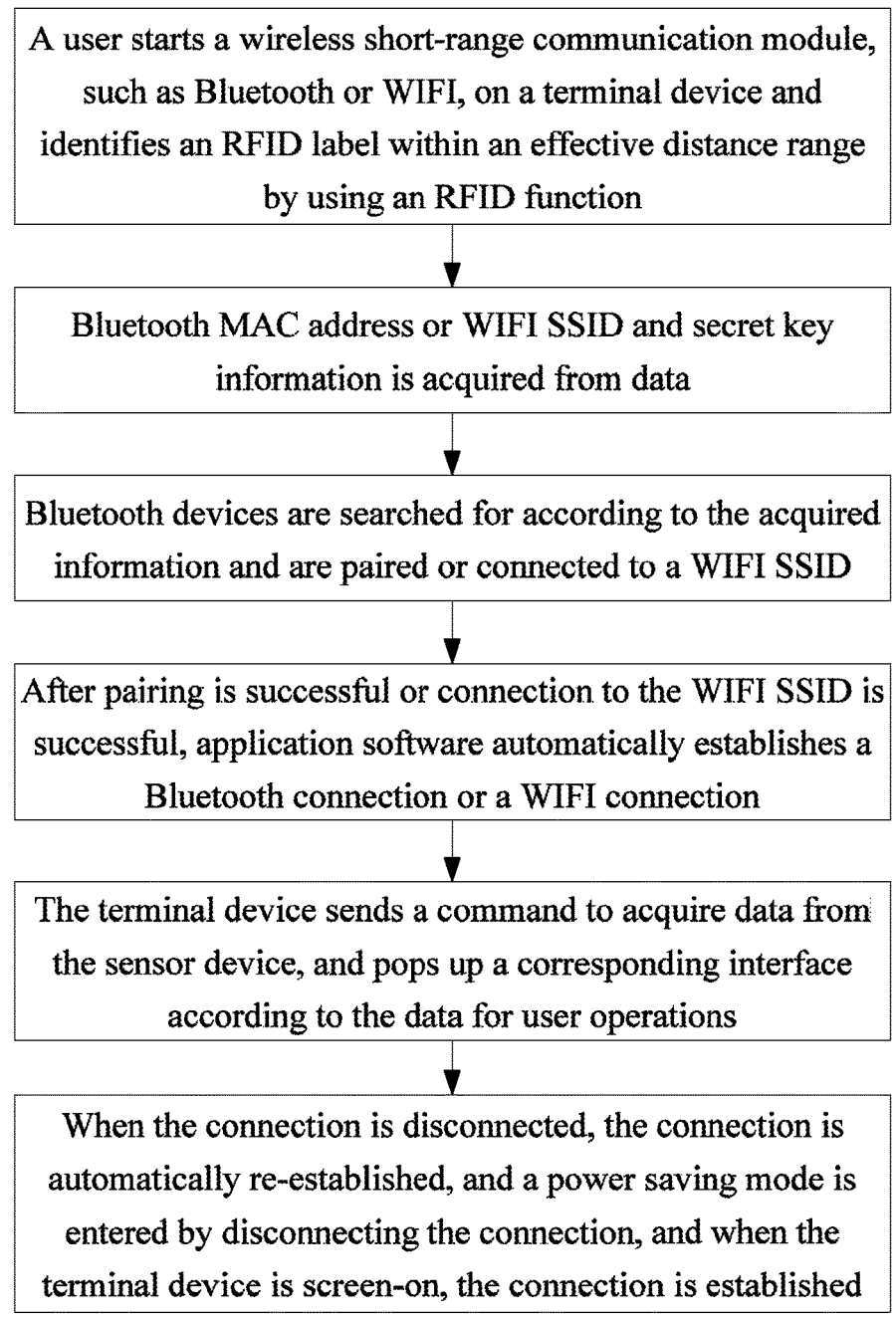
FIG. 4 is a flowchart illustrating operations of a system adopting an electronic label in the disclosure, wherein alternatively, a bar code can be applied to the operation flow.

A control method for performing rapid connection and data transmission between devices will be illustrated in FIGS. 2 to 4. A sensor device has a wireless short-range communication function such as Bluetooth or WIFI. The rapid connection and rapid data transmission thereafter are implemented through an RFID electronic label and a bar code according to the following steps.

Step 1: Information about a wireless short-range communication module, such as an MAC address of a Bluetooth module or a WIFI wireless network SSID and a secret key are written into a label by an RFID reader and writer module. And a serial number and type information of the sensor device is also written into an RFID label by the RFID reader and writer module. When a bar code label is fixed onto the sensor device, the above information is encoded and printed into a bar code by a bar code printer. The RFID label or the bar code label is fixed onto the sensor device for convenience of identification of a terminal device.

Step 2: When it is necessary to acquire data information about the sensor device, and if the RFID label is used on the sensor device, label information is read by using an RFID function of the terminal device to acquire MAC address or WIFI SSID name and secret key information. A used wireless short-range communication mode is determined from the information which is read from the RFID label. When a Bluetooth function is used, the terminal device automatically starts a Bluetooth module and searches for a Bluetooth module with the corresponding name. After the Bluetooth module is found, Bluetooth pairing is performed. The secret key information is automatically input in this process. After pairing is successful, a command is sent to establish a connection. When the bar code label is used on the sensor, the terminal device starts a bar code reader and reads information from the bar code label. The processes of Bluetooth pairing and connection establishment are the same as the processes mentioned above. When the acquired information indicates that the sensor is connected through WIFI, the terminal device is automatically connected to an SSID of the corresponding wireless local area network and inputs the secret key information. After the connection to the SSID of the wireless local area network is successful, client software on the terminal device will be automatically connected to the sensor device to acquire data from the sensor device.

Step 3: After the connection is established, the terminal device sends a command to the sensor device. The sensor device returns the collected data information to the terminal device. The data information contains device information of a certain frame format. The terminal device compares the device information with the device information obtained previously. When the comparison result indicates that the information is correct, a corresponding interface is entered according to a device type for user operations. For example, when temperature information is to be presented, a temperature interface is popped up, and when blood pressure information is to be presented, a blood pressure interface is popped up.

Step 4: An established data link will be maintained and the terminal device will send a command regularly to obtain data, until the terminal device starts to scan by using the RFID reader and writer module or the bar code reader for a next time. When the link is disconnected, the connection will be automatically re-established according to the Bluetooth MAC address or the SSID of the wireless local area network and the secret key.

Step 5: When data transmission is completed, the connection may be disconnected for saving power. A user only needs to click an off key on a data operation interface to switch off the wireless short-range communication module. After the terminal device is screen-off, a power-saving mode is entered or the wireless short-range communication module is automatically disconnected. After the terminal device is screen-on, the connection is re-established.

A control method for performing rapid connection and data transmission between devices is provided. When a sensor device has a wireless short-range communication function such as Bluetooth or WIFI, rapid connection and then rapid data transmission are implemented through an RFID label and a bar code label according to Steps 1 to 5. When a used sensor device does not have the wireless short-range communication function, the RFID label and the bar code label only contain device information, and after RFID label data or bar code label data is read, a system will automatically judge what the device is, and then enters a corresponding interface for convenience of user operations. For example, when blood pressure information is to be presented, a blood pressure information input interface is entered, and when blood glucose information is to be presented, a blood glucose information input interface is entered. Thus, the user has a convenient and fast use experience.

A control method for performing rapid connection and data transmission between devices is provided. The method is applied to data transmission devices which include at least one master device and a slave device. Both the master device and the slave device include a wireless short-range communication module (e.g., Bluetooth module or WIFI module). The master device includes a master control unit, a power management unit, a wireless short-range communication module, a wireless local-area or wide-area communication module, an RFID reader and writer module, a bar code reader and an antenna. The power management unit, the wireless short-range communication module, the wireless local-area or wide-area communication module, the bar code reader and the RFID reader and writer module are electrically connected to the master control unit, respectively. The antenna is connected to the RFID reader and writer module. The power management unit is used to supply power to the whole system. The wireless short-range communication module is used to transmit data, including electronic documents, recordings and pictures, on a large scale between the master device and the slave device. The RFID reader and writer module is used to complete collection of RFID label data. The bar code reader is used to identify a bar code label.

It is preferable that the RFID reader and writer module supports a plurality of bands, and the master control unit consists of a mobile phone platform and an operating system, and is configured to perform RFID data processing and Bluetooth communication data processing.

It is preferable that both the transmitting power and receiving power of the RFID reader and writer module are adjustable.

It is preferable that the RFID reader and writer module performs transmission and receiving by adopting an omni-directional antenna.

It is preferable that the power management unit supplies power to a lithium battery with output voltage after being processed by the power management unit.

It is preferable that the master control unit is also integrated with a wireless local-area or wide-area communication module, and is configured to perform connection and data exchange with an external server (e.g., data center) through wireless connection, and the master control unit is also provided with an LCD screen for human-computer interaction.

It is preferable that the bar code reader may read bar code information, a bar code containing device and secret key information; and light emitted by the bar code reader contains location light, capable of rapidly and accurately reading the bar code.

After adopting the abovementioned system and control method, the disclosure has the following advantages. During use of many wireless short-range communications, a module such as Bluetooth will be operated via a specific interface. A Bluetooth device is started, and then Bluetooth sweeping is started. When some other Bluetooth devices are found, Bluetooth pairing is prompted. After pairing is successful, a connection will be established. During this process, the connection can be established by knowing a password in advance, data transmission may be started after the connection is established. After the data transmission is completed, the Bluetooth device should be manually switched off. Device connection and data transmission can be implemented only when a wireless short-range communication module namely a WIFI module manually selects a WIFI SSID and then inputs the password. The present solution solves the problems of complicated and unsafe wireless device connection, a Bluetooth MAC address, the WIFI SSID and a secret key are acquired through an RFID or an implementation mode of reading a bar code, application software in the terminal device automatically and rapidly establishes a Bluetooth or WIFI connection according to the acquired information to transmit data, and the acquired information contains device information, so information about the collected data may be known, such that a corresponding interface can be popped up for a user to operate. The convenient and fast effects are achieved, and the problem of complicated input of data into a device without a wireless communication function is also solved. All data transmissions are performed according to a certain frame format and encrypted, so the data safety is high, use is greatly facilitated, and the efficiency of data transmission between devices is improved.

An RFID technology adopted in the present solution can implement long transmission distance, large coverage area and short response time, and can dynamically transmit data in real time to implement data exchange between two devices, an RFID supporting a plurality of bands and supporting reading of a plurality of electronic labels. A bar code reader adopted in the present solution is convenient in location, high in decoding efficiency, high in error-correcting capacity, and capable of rapidly identifying bar code information. The RFID and bar code technologies are combined with a wireless technology, so the efficiency of rapid connection between devices is effectively improved, and the rate of data collection between sensor devices is improved.

To sum up, the disclosure provides a safe and easy-to-use control method for performing rapid connection and data transmission between devices without manually starting a wireless short-range communication function such as a Bluetooth function and without manually inputting a user verification code, thereby omitting the process of manual matching.

Practice has proven that after adopting the abovementioned system and control method, the disclosure has the following advantages. The disclosure solves the problem of complicated use of a wireless short-range communication module such as the problems of complicated and unsafe Bluetooth pairing and connection. Bluetooth starting and secret key acquisition can be implemented in an automatic manner through an RFID. After data transmission is completed, the Bluetooth connection is automatically disconnected to save power consumption. A secret key can be dynamically acquired, and a dynamic encryption technology is adopted, so the safety of data can be effectively improved, thereby greatly facilitating usage, and improving the working efficiency of Bluetooth use.

The RFID technology adopted in the present solution can implement long transmission distance, large coverage area and short response time, and can dynamically transmit data in real time to implement data exchange between two devices. The RFID technology is combined with the wireless technology, such that the advantages of wireless short-range communications such as the advantage of large data volume of Bluetooth communications can be maximally achieved. In the solution, the transmission frequency of the designed RFID technology supports a plurality of bands, the anti-interference capacity is strong, the transmission rate is high, and due to adoption of a software encryption technology, the safety performance is good.

To sum up, the disclosure provides a safe and easy-to-use control method for performing rapid connection and data transmission between devices without manually starting a wireless short-range communication function such as a Bluetooth function and without manually inputting a user verification code, thereby omitting the process of manual matching.

The disclosure and the implementation manners thereof are described above without restrictions. What is shown in the drawings is only one of the implementation manners of the disclosure, and an actual structure is not limited thereto. In a word, if a person of ordinary skill in the art designs structure manners and embodiments similar to the present technical solution without creativeness after being inspired without departing from the creation purpose of the disclosure, the structure manners and the embodiments should fall within the scope of protection of the disclosure.

The invention claimed is:

1. A control method for performing rapid connection and data transmission between devices, comprising:
   writing, by a Radio Frequency Identification (RFID) reader and writer module, relevant information about a wireless short-range communication module in a slave device into an RFID label, the relevant information comprising address information and slave device type information, or printing, by a bar code printer, the relevant information into a bar code label; and fixing the RFID label or the bar code label onto the slave device; and
   reading, by the RFID reader and writer module or a bar code reader in the master device, information from the RFID label or from the bar code label; starting a function of the wireless short-range communication module according to the read information; automatically matching relevant information, and popping up a corresponding user interface according to the obtained slave device type information to display collected data;
   wherein when the slave device has a wireless short-range communication function, for performing rapid connection and then rapid data transmission by using a Radio Frequency Identification (RFID) label, the method comprises:
   Step 1: writing, by a Radio Frequency Identification (RFID) reader and writer module, relevant information about a wireless short-range communication module into an RFID label, writing a serial number and type information of the slave device into the RFID label, the relevant information about the wireless short-range communication module comprising a Media Access Control (MAC) address of a Bluetooth or a WIFI wireless network Service Set Identifier (SSID) and a secret key, and fixing the RFID label onto the slave device;
   Step 2: when it is necessary to acquire data information about the slave device, reading information from the RFID label by using an RFID function of a terminal device, to acquire information about the wireless short-range communication module and slave device type information; judging a used communication mode from the read information; when a Bluetooth function is used, automatically starting, by the terminal device, a Bluetooth module, searching for a Bluetooth module with the corresponding name; after the Bluetooth module is found, performing Bluetooth pairing by automatically inputting the read secret key information; and after pairing is successful, sending a command to establish a connection; and when the read information indicates that the slave device is connected through WIFI, automatically connecting the terminal device to an SSID of the corresponding wireless local area network and inputting the read secret key information; and after the connection to the SSID of the wireless local area network is successful, automatically connecting client software on the terminal device to the slave device to acquire data from the slave device; and
   Step 3: after the connection is established, automatically selecting and entering, by the terminal device, an application interface for the slave device according to the slave device type information acquired from the RFID label; when the slave device acquires sensing data, automatically uploading the sensing data to the application interface for the slave device of the terminal device through the wireless short-range communication connection that is already established; and if necessary, uploading the sensing data to a remote background server through a wireless local-area or wide-area module of the terminal device.

2. The control method for performing rapid connection and data transmission between devices as claimed in claim 1, wherein the collected data is transmitted to a data center by a wireless local-area or wide-area communication module.

3. The control method for performing rapid connection and data transmission between devices according to claim 2, wherein the wireless local-area communication module is wireless local-area WIFI module, and the wide-area communication module is selected from a group consisting of a wireless wide-area 2G module, a wireless wide-area 3G module and a wireless wide-area 4G module.

4. The control method for performing rapid connection and data transmission between devices as claimed in claim 1, wherein after the Step 3, the method further comprises:
   Step X: maintaining the established data link, until the terminal device starts to read the RFID label for next time or before establishing a new wireless short-range communication connection; and when the link is broken, automatically re-establishing the connection according to the Bluetooth MAC address or the SSID and the secret key of the wireless local area network; or
   Step Y: when data transmission is completed and the connection needs to be disconnected, clicking, by a user, an off key on a user operation interface to switch off a Bluetooth or WIFI device; or, after the terminal device is screen-off, entering a power-saving mode or automatically disconnecting the connection of the wireless short-range communication module, and after the terminal device is screen-on, re-establishing the connection.

5. The control method for performing rapid connection and data transmission between devices as claimed in claim 1, wherein when the sensor device has the wireless short-range communication function, implementing rapid connection and then implementing rapid data transmission by using the RFID label or a bar code label by performing the Steps 1 to 3 and the Steps X and Y.

6. The control method for performing rapid connection and data transmission between devices according to claim 5, wherein the wireless short-range communication function is selected from a group consisting of Bluetooth, ZigBee, WIFI.

7. The control method for performing rapid connection and data transmission between devices according to claim 1, wherein the slave device is a sensor device, and the master device is a terminal device.

8. The control method for performing rapid connection and data transmission between devices according to claim 1, wherein the automatically matching relevant information comprises automatically matching a secret key.

9. The control method for performing rapid connection and data transmission between devices according to claim 1, wherein the wireless short-range communication module is selected from a group consisting of Bluetooth, ZigBee and WIFI.

10. The control method for performing rapid connection and data transmission between devices according to claim 1, wherein when the sensor device type information indicates that the sensor device is a thermometer, the Step 3 comprises: after the connection is established, automatically selecting and entering, by the terminal device, a temperature collection interface according to the sensor device type information acquired from the RFID label; when the sensor device acquires a body temperature of a patient, automatically uploading the body temperature to the application interface for the sensor device of the terminal device through the wireless short-range communication connection that is already established.

11. The control method for performing rapid connection and data transmission between devices according to claim 1, wherein the background server is a data center.

12. A system for data transmission, to which a control method for performing rapid connection and data transmission between devices is applied, the system comprising at least one master device and a slave device, wherein both the master device and the slave device comprise a wireless short-range communication module; the master device comprises a master control unit, a wireless short-range communication module, a wireless local-area or wide-area communication module, a Radio Frequency Identification (RFID) reader and writer module, an antenna, and a bar code reader; the power management unit, the wireless short-range communication module, the wireless local-area or wide-area communication module, the bar code reader and the RFID reader and writer module are electrically connected to the master control unit, respectively; the antenna is connected to the RFID reader and writer module; the wireless short-range communication module is configured to transmit data between the master device and the slave device; the RFID reader and writer module is configured to perform data collection of an RFID electronic label; and the bar code reader is configured to identify a bar code label;

wherein when the slave device has a wireless short-range communication function, for performing rapid connection and then rapid data transmission by using a Radio Frequency Identification (RFID) label, the slave device is configured to perform:

Step 1: writing, by a Radio Frequency Identification (RFID) reader and writer module, relevant information about a wireless short-range communication module into an RFID label, writing a serial number and type information of the slave device into the RFID label, the relevant information about the wireless short-range communication module comprising a Media Access Control (MAC) address of a Bluetooth or a WIFI wireless network Service Set Identifier (SSID) and a secret key, and fixing the RFID label onto the slave device;

the master device is configured to perform:

Step 2: when it is necessary to acquire data information about the slave device, reading information from the RFID label by using an RFID function of a terminal device, to acquire information about the wireless short-range communication module and slave device type information; judging a used communication mode from the read information; when a Bluetooth function is used, automatically starting, by the terminal device, a Bluetooth module, searching for a Bluetooth module with the corresponding name; after the Bluetooth module is found, performing Bluetooth pairing by automatically inputting the read secret key information; and after pairing is successful, sending a command to establish a connection; and when the read information indicates that the slave device is connected through WIFI, automatically connecting the terminal device to an SSID of the corresponding wireless local area network and inputting the read secret key information; and after the connection to the SSID of the wireless local area network is successful, automatically connecting client software on the terminal device to the slave device to acquire data from the slave device; and Step 3: after the connection is established, automatically selecting and entering, by the terminal device, an application interface for the slave device according to the slave device type information acquired from the RFID label; when the slave device acquires sensing data, automatically uploading the sensing data to the application interface for the slave device of the terminal device through the wireless short-range communication connection that is already established; and if necessary, uploading the sensing data to a remote background server through a wireless local-area or wide-area module of the terminal device.

13. The system as claimed in claim 12, wherein the RFID reader and writer module supports a plurality of bands, and the master control unit consists of a mobile phone platform and an operating system, and is configured to perform RFID data processing.

14. The system as claimed in claim 12, wherein the RFID reader and writer module performs transmission and receiving by adopting an omnidirectional antenna.

15. The system as claimed in claim 12, wherein a wireless local area network WIFI module or a wireless wide area network 2G/3G/4G module is integrated in the master control unit, and is configured to complete connection and data exchange with an external server through WIFI or 2G/3G/4G wireless communications, and the master control unit is also provided with a Liquid Crystal Display (LCD) screen for human-computer interaction.

16. The system according to claim 15, wherein the external server is a data center.

17. The system as claimed in claim 12, wherein the bar code reader may read bar code information, a bar code containing device and secret key information; and light emitted by the bar code reader contains location light, capable of rapidly and accurately reading the bar code.

\* \* \* \* \*